(12) United States Patent
Aihara

(10) Patent No.: US 10,213,846 B2
(45) Date of Patent: Feb. 26, 2019

(54) METHOD OF MACHINING WORKPIECE AND BORING DRILL

(71) Applicant: KYORAKU CO., LTD., Kyoto (JP)

(72) Inventor: Kousuke Aihara, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 15/507,514

(22) PCT Filed: Aug. 25, 2015

(86) PCT No.: PCT/JP2015/073894
§ 371 (c)(1),
(2) Date: Feb. 28, 2017

(87) PCT Pub. No.: WO2016/039134
PCT Pub. Date: Mar. 17, 2016

(65) Prior Publication Data
US 2017/0259352 A1 Sep. 14, 2017

(30) Foreign Application Priority Data
Sep. 10, 2014 (JP) .................................. 2014-184552

(51) Int. Cl.
*B23B 51/04* (2006.01)
*B65D 23/02* (2006.01)
(Continued)

(52) U.S. Cl.
CPC .......... *B23B 51/0406* (2013.01); *B23B 35/00* (2013.01); *B26F 1/16* (2013.01);
(Continued)

(58) Field of Classification Search
CPC ................. B23B 51/04; B23B 51/0406; B23B 2251/201; Y10T 408/45; Y10T 408/895; Y10T 408/896
See application file for complete search history.

(56) References Cited

U.S. PATENT DOCUMENTS 221,692 A * 11/1879 Miller ................. B23B 51/0473
408/204
280,026 A * 6/1883 Forstner ................. B23B 27/007
408/199
(Continued)

FOREIGN PATENT DOCUMENTS

EP 0458047 A1 11/1991
JP 04217498 A * 8/1992
(Continued)

OTHER PUBLICATIONS

Extended European Search Report dated Jul. 26, 2017, including the Supplementary European Search Report and the European Search Opinion, in connection with EP Application No. 15839545.9 (8 pgs.).
(Continued)

*Primary Examiner* — Eric A Gates
(74) *Attorney, Agent, or Firm* — Maier & Maier, PLLC

(57) ABSTRACT

A method of machining a workpiece is provided that is capable of forming a fresh air inlet in an arbitrary position in an outer shell of a container. According to the present invention, a method of machining a workpiece is provided that includes: machining to form a round hole in a workpiece using a boring drill having a tubular end portion, the end portion provided with a flat surface and a notch, and having a blade on a side of the notch, by pressing the flat surface against the workpiece while rotating the drill to contact the blade with the workpiece.

4 Claims, 14 Drawing Sheets

SET CONTAINER

CUT WITH SUCTION

(51) Int. Cl.
  *B65D 25/16*  (2006.01)
  *B23B 35/00*  (2006.01)
  *B26F 1/16*  (2006.01)

(52) U.S. Cl.
  CPC ............ *B65D 23/02* (2013.01); *B65D 25/16* (2013.01); *B23B 2226/61* (2013.01); *B23B 2251/201* (2013.01); *B65D 2205/00* (2013.01); *Y10T 408/45* (2015.01); *Y10T 408/896* (2015.01)

(56) References Cited

U.S. PATENT DOCUMENTS

| | | | | |
|---|---|---|---|---|
| 1,781,863 | A * | 11/1930 | Shoemaker | B26F 1/16 30/168 |
| 1,807,126 | A * | 5/1931 | Morrill | B27G 15/00 408/207 |
| 1,907,880 | A * | 5/1933 | Royle | B23C 5/10 144/241 |
| 4,534,803 | A * | 8/1985 | Asano | B23Q 1/0018 134/102.3 |
| 4,595,321 | A * | 6/1986 | Van Dalen | B23B 51/0406 408/205 |
| 4,669,931 | A * | 6/1987 | Isaksson | B23B 51/0406 408/203.5 |
| 4,762,444 | A * | 8/1988 | Mena | B23G 5/005 408/222 |
| 4,854,788 | A * | 8/1989 | Okinaga | B24B 45/00 175/404 |
| 5,049,010 | A * | 9/1991 | Oakes | B23B 51/0426 408/201 |
| 5,681,134 | A * | 10/1997 | Ebert | B23B 51/0406 144/218 |
| 5,823,720 | A * | 10/1998 | Moore | B23B 27/045 408/204 |
| 8,622,665 | B2 * | 1/2014 | Ibarra | B23B 51/04 408/206 |
| 8,753,049 | B2 * | 6/2014 | Osawa | B23B 51/0406 408/204 |
| 2007/0040306 | A1 | 2/2007 | Morel et al. | |
| 2014/0239002 | A1 | 8/2014 | Miyajima | |

FOREIGN PATENT DOCUMENTS

| | | | |
|---|---|---|---|
| JP | 06320498 | A * | 11/1994 |
| JP | 07009396 | A * | 1/1995 |
| JP | H08-175568 | A | 7/1996 |
| JP | 3455606 | A | 9/1996 |
| JP | H09-267207 | A | 10/1997 |
| JP | 2003-340625 | A | 12/2003 |
| JP | 2004034255 | A * | 2/2004 |
| JP | 2008-168398 | A | 7/2008 |
| JP | 2009-184029 | A | 8/2009 |
| SU | 1495128 | A * | 7/1989 |

OTHER PUBLICATIONS

Taiwanese Office Action dated Feb. 22, 2017, in connection with coounterpart TW Application No. 104129885 (8 pgs., including English translation).

International Search Report dated Nov. 17, 2015 from corresponding International Patent Application No. PCT/JP2015/073894; 2 pgs.

\* cited by examiner

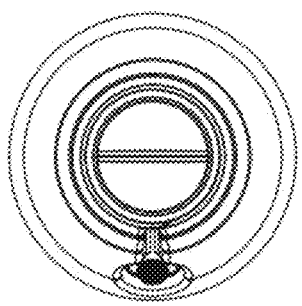
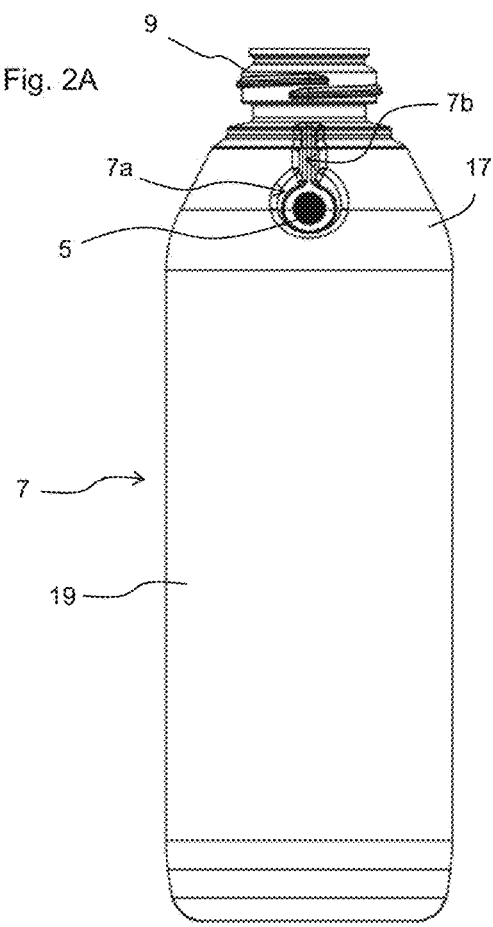
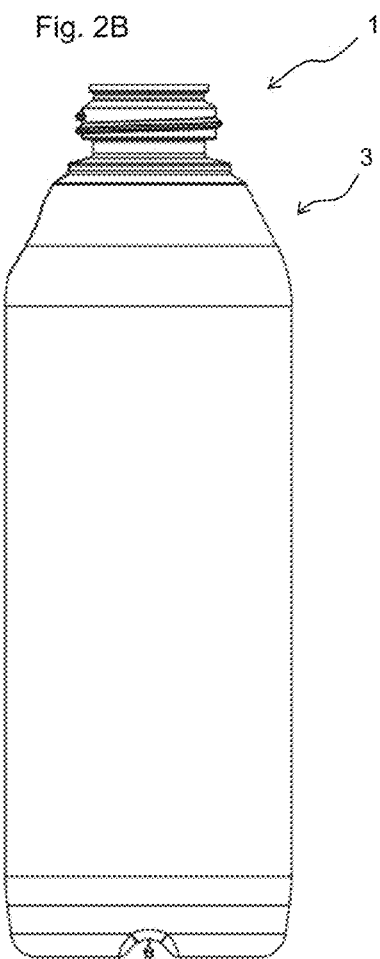
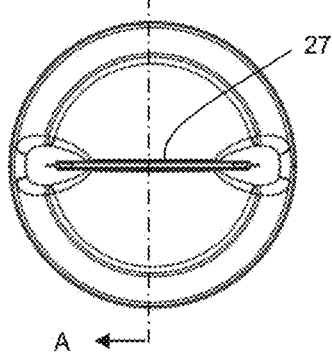

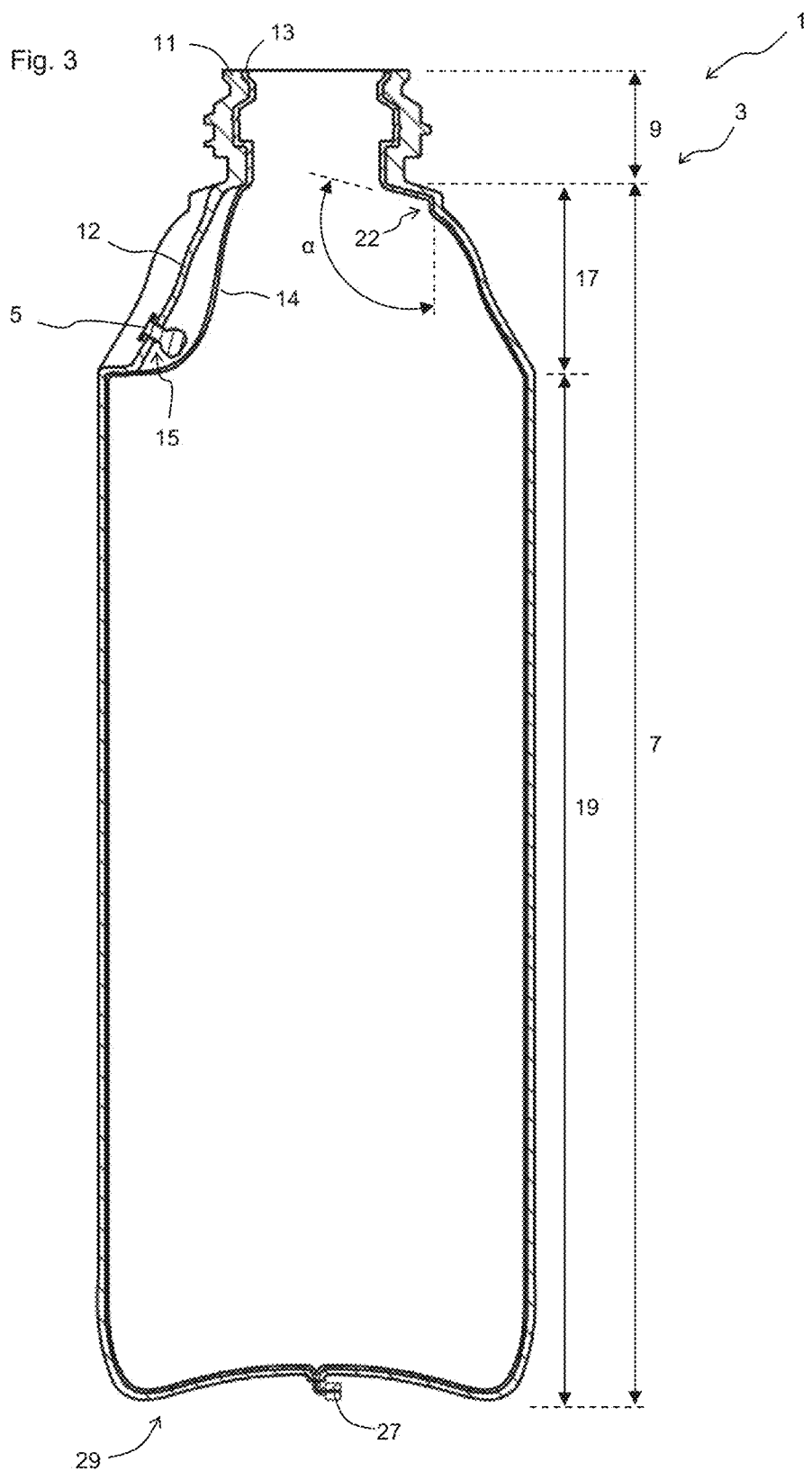

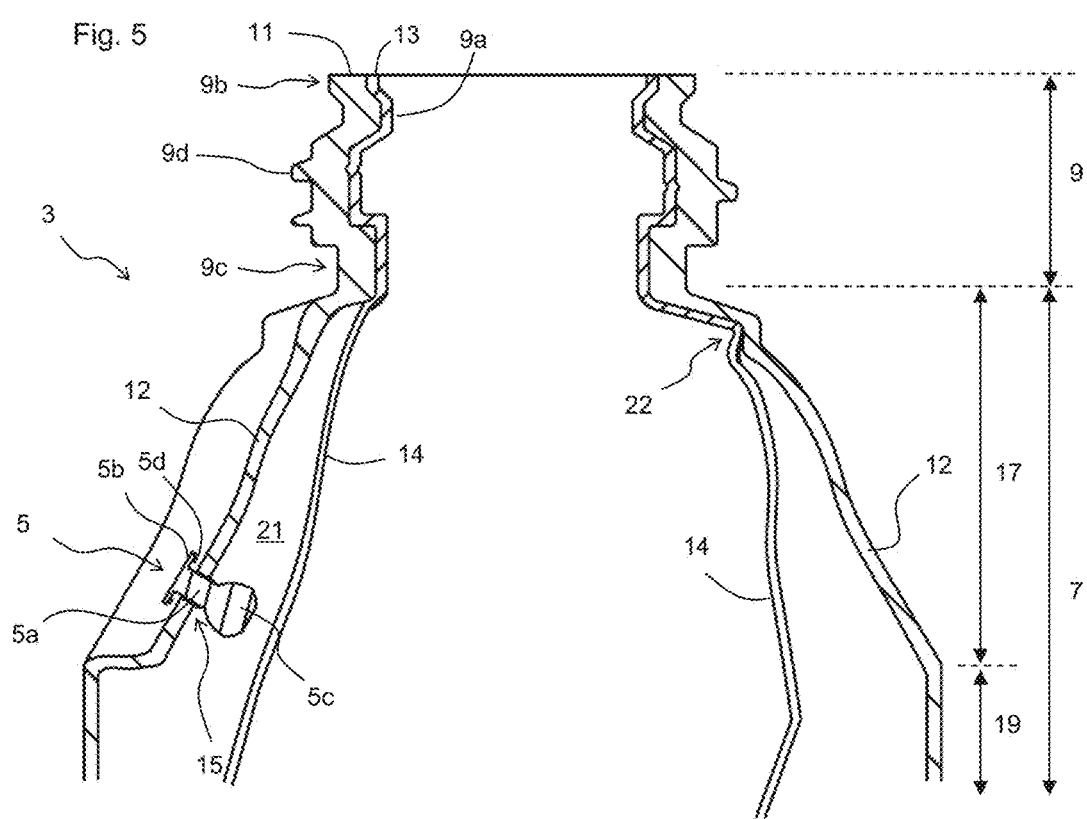

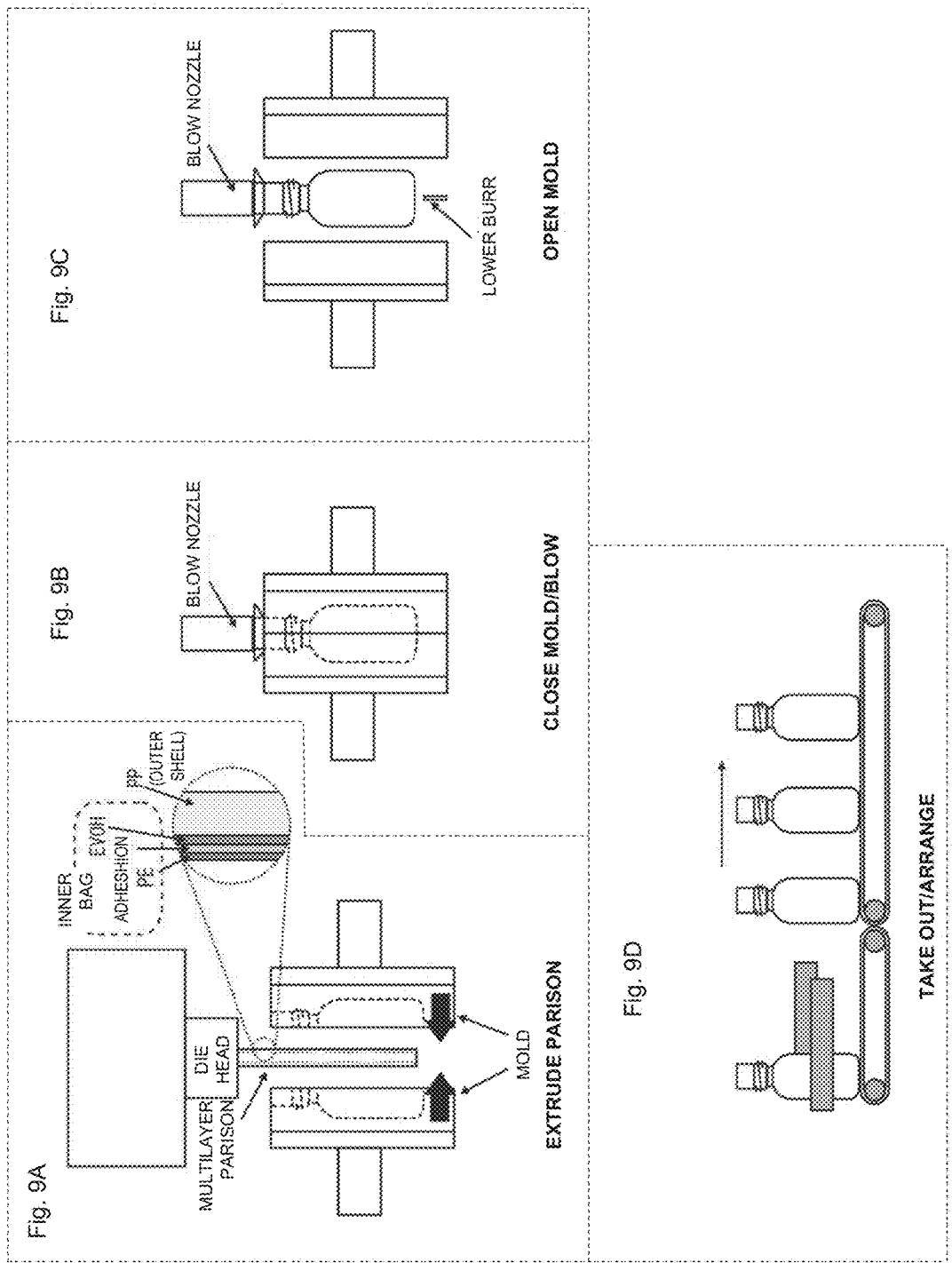

SET CONTAINER

CUT WITH SUCTION

EMIT PIECE BY BLOW

PRELIMINARILY PEEL
INNER LAYER

ENLARGED VIEW OF A REGION C

ENLARGED VIEW OF A REGION B

A-A CROSS SECTIONAL VIEW

CUT UPPER TUBULAR PART

INSERT VALVE MEMBER INTO OUTSIDE AIR INTRODUCTION HOLE

RELIEF PART HOT AIR BENDING STEP

RESTORE INNER PACKAGE BY BLOWING

CHARGE CONTENTS

CAPPING

SHRINK PACKAGING

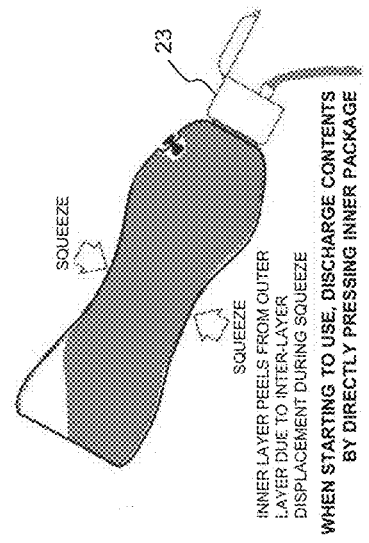
Fig. 14A
Fig. 14B
Fig. 14C
INNER LAYER PEELS FROM OUTER LAYER DUE TO INTER-LAYER DISPLACEMENT DURING SQUEEZE
WHEN STARTING TO USE, DISCHARGE CONTENTS BY DIRECTLY PRESSING INNER PACKAGE
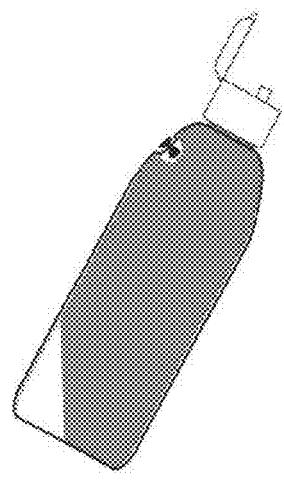
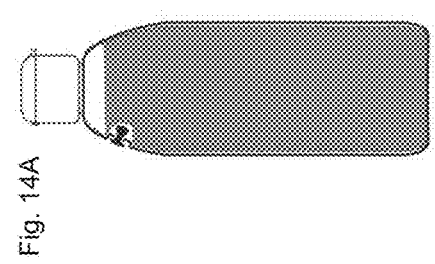
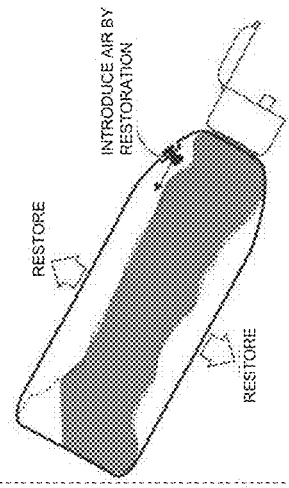
Fig. 14D
Fig. 14E
Fig. 14F
INTRODUCE AIR BETWEEN OUTER LAYER AND INNER LAYER BY REPEATING SQUEEZE AND DISCHARGE
SQUEEZE CONTENTS BY MAKING OUTSIDE PRESSURE HIGHER THAN INSIDE PRESSURE
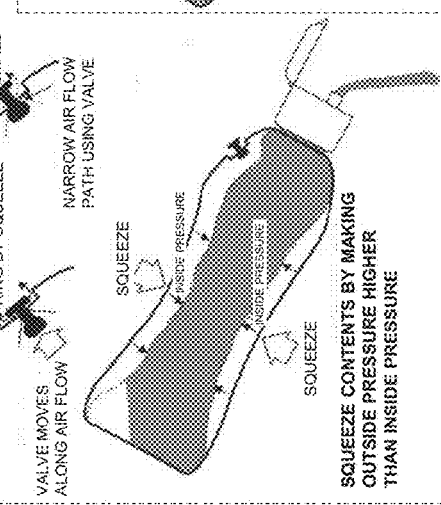
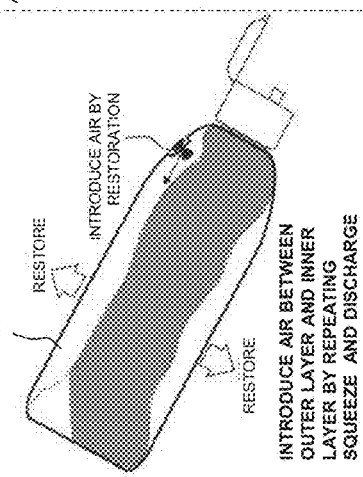

METHOD OF MACHINING WORKPIECE AND BORING DRILL

TECHNICAL FIELD

The present invention relates to a method of machining a workpiece and a boring drill. This method is preferably applied to a procedure of forming a fresh air inlet in an outer shell of a delaminatable container.

BACKGROUND ART

Conventionally, delaminatable containers are known that inhibit entrance of air inside the container by an inner layer delaminated from an outer layer and shrunk with a decrease in the contents (e.g., PTL 1). Such delaminatable container is provided with an inner bag composed of an inner layer and an outer shell composed of an outer layer.

The outer shell of the delaminatable container is provided with a fresh air inlet to enable shrinkage of the inner bag. The fresh air inlet is generally formed using a punch cutter or the like from outside the container where it is not easy to securely form a fresh air inlet in the outer shell without damaging the inner bag.

CITATION LIST

Patent Literature

[PTL 1] Japanese Patent No. 3455606

SUMMARY OF INVENTION

Technical Problem

In PTL 1, the fresh air inlet is formed in the mouth from the mouth outer surface side by, in a state of causing a bearer to abut on the mouth inner surface, bringing the cutter blade at the end of the punch cutter in proximity to the bearer. Then, by setting a gap between the bearer and the cutter blade not to be in a predetermined distance or less, it is prevented that the cutter blade damages the inner bag of the delaminatable container.

However, the method in PTL 1 has a problem that it is difficult to form a fresh air inlet in a portion other than the mouth of the container.

The present invention has been made in view of such circumstances, and it is to provide a method of machining a workpiece that is capable of forming a fresh air inlet in an arbitrary position of the outer shell of the container.

Solution to Problem

According to the present invention, a method of machining a workpiece is provided that includes: machining to form a round hole in a workpiece using a boring drill having a tubular end portion, the end portion provided with a flat surface and a notch, and having a blade on a side of the notch by pressing the flat surface against the workpiece while rotating the drill to contact the blade with the workpiece.

In the present invention, a workpiece is machined using a boring drill having a tubular end portion, the end portion provided with a flat surface and a notch, and having a blade on a side of the notch. When the workpiece has certain stiffness and is readily deformed, the drill thus configured slightly digs in the workpiece at the end by pressing the flat surface against the workpiece while rotating the drill. As a result, entrance of the workpiece into the notch causes the blade to contact with the workpiece to form a round hole in the workpiece.

The outer shell of a general delaminatable container has certain stiffness and is readily elastically deformed. A round hole is thus readily formed by the method of the present invention. Meanwhile, when the flat surface of the drill is pressed on the inner bag of the delaminatable container, the inner bag is separated from the outer shell to be deformed towards the inside of the delaminatable container. The flat surface thus does not dig in the inner bag. The blade, therefore, does not make contact with the inner bag not to damage the inner bag. According to the present invention, a round hole is thus readily formed only in the outer shell of the delaminatable container. The round hole is applicable as a fresh air inlet to introduce fresh air between the outer shell and the inner bag.

Various embodiments of the present invention are exemplified below. The embodiments described below may be combined with each other.

Preferably, the workpiece is a delaminatable container including an outer shell and an inner bag, the inner bag delaminating from the outer shell to be shrunk with a decrease in the contents, and the machining includes forming a fresh air inlet in the outer shell by pressing the flat surface against the outer shell to contact the blade with the outer shell.

Preferably, the end portion of the drill has a C-shaped cross section.

Preferably, the flat surface has a radial width from 0.1 to 0.2 mm.

Preferably, the end portion has an inner surface provided with a tapered surface widening towards an end.

According to another aspect of the present invention, a boring drill is provided that includes: a tubular end portion; a flat surface and a notch provided in the end portion; and a blade on a side of the notch.

BRIEF DESCRIPTION OF DRAWINGS

FIG. 1A illustrates an overall view, FIG. 1B illustrates the bottom, and FIG. 1C illustrates an enlarged view of and around a valve member mounting recess 7a. FIG. 1C illustrates a state of removing a valve member 5.

FIGS. 2A-2C illustrate the delaminatable container 1 in FIGS. 1A-1C, where FIG. 2A is a front view, FIG. 2B is a rear view, FIG. 2C is a plan view, and FIG. 2D is a bottom view.

FIG. 3 is an A-A cross-sectional view in FIG. 2D. Note that FIGS. 1A through 2D illustrate states before bending a bottom seal protrusion 27 and FIG. 3 illustrates a state after bending the bottom seal protrusion 27.

FIG. 5 illustrates a state where delamination of an inner layer 13 proceeds from the state in FIG. 4.

FIG. 6A illustrates a state before bending the bottom seal protrusion 27 and FIG. 6B illustrates a state after bending the bottom seal protrusion 27.

FIGS. 9A-9D illustrate a procedure of manufacturing the delaminatable container 1 in FIGS. 1A-1C.

FIG. 11A is a front view, FIG. 11B is a left side view, FIG. 11C is an A-A cross-sectional view, FIG. 11D is an enlarged view of a region B, and FIG. 11E is an enlarged view of a region C.

FIG. 12A is a front view and FIG. 12B is a left side view.

FIGS. 14A-14F illustrate a method of using the delaminatable container 1 in FIGS. 1A-1C.

DESCRIPTION OF EMBODIMENTS

Figure 1A:
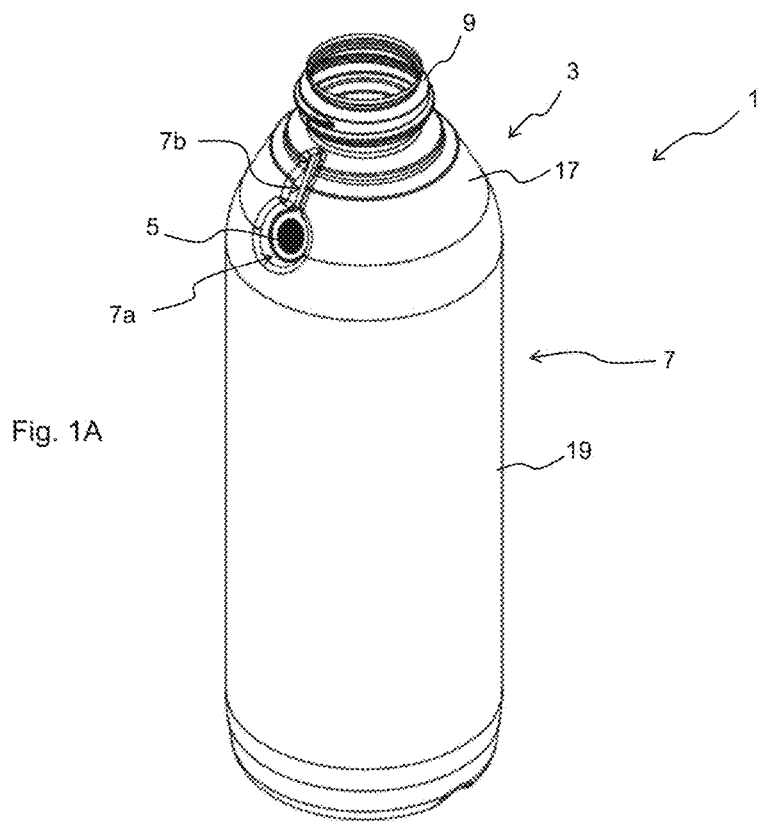
FIGS. 1A-1C are perspective views illustrating a structure of a delaminatable container 1 in a first embodiment of the present invention, where

Embodiments of the present invention are described below. Various characteristics in the embodiments described below may be combined with each other. Each characteristic is independently inventive.

As illustrated in FIGS. 1A through 2D, a delaminatable container 1 in the first embodiment of the present invention is provided with a container body 3 and a valve member 5. The container body 3 is provided with a storage portion 7 to store the contents and a mouth 9 to deliver the contents from the storage portion 7.

As illustrated in FIG. 3, the container body 3 is provided with an outer layer 11 and an inner layer 13 in the storage portion 7 and the mouth 9. An outer shell 12 is composed of the outer layer 11 and an inner bag 14 is composed of the inner layer 13. Due to delamination of the inner layer 13 from the outer layer 11 with a decrease in the contents, the inner bag 14 delaminates from the outer shell 12 to be shrunk.

Figure 4:
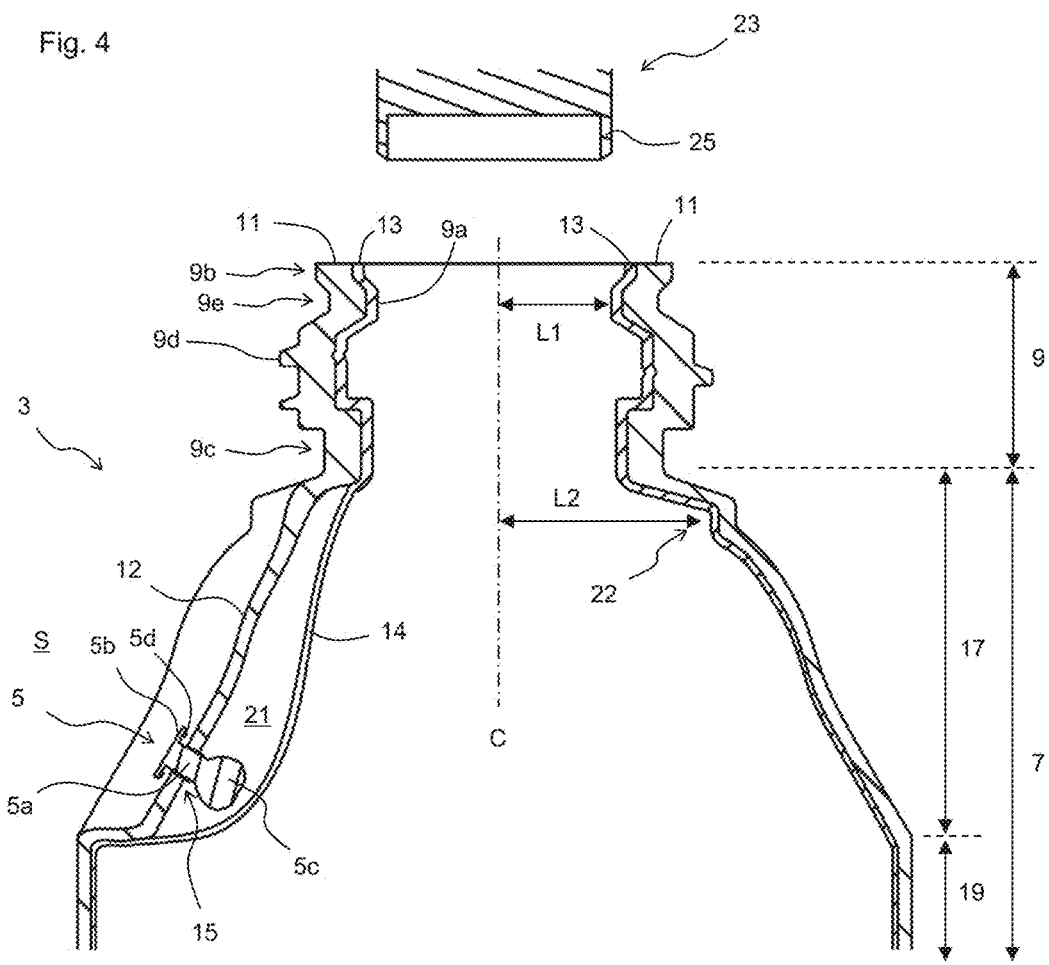
FIG. 4 is an enlarged view of a region including a mouth 9 in FIG. 3.

As illustrated in FIG. 4, the mouth 9 is equipped with external threads 9d. To the external threads 9d, a cap, a pump, or the like having internal threads is mounted. FIG. 4 partially illustrates a cap 23 having an inner ring 25. The inner ring 25 has an outer diameter approximately same as an inner diameter of the mouth 9. An outer surface of the inner ring 25 abuts on an abutment surface 9a of the mouth 9, thereby preventing leakage of the contents. In the present embodiment, the mouth 9 is equipped with an enlarged diameter portion 9b at the end. The enlarged diameter portion 9b has an inner diameter greater than the inner diameter in an abutment portion 9e, and thus the outer surface of the inner ring 25 does not make contact with the enlarged diameter portion 9b. When the mouth 9 does not have the enlarged diameter portion 9b, a defect sometimes occurs in which the inner ring 25 enters between the outer layer 11 and the inner layer 13 in the case where the mouth 9 has an even slightly smaller inner diameter due to variations in manufacturing. In contrast, when the mouth 9 has the enlarged diameter portion 9b, such defect does not occur even in the case where the mouth 9 has a slightly varied inner diameter.

The mouth 9 is also provided with an inner layer support portion 9c to inhibit slip down of the inner layer 13 in a position closer to the storage portion 7 than the abutment portion 9e. The inner layer support portion 9c is formed by providing a narrow part in the mouth 9. Even when the mouth 9 is equipped with the enlarged diameter portion 9b, the inner layer 13 sometimes delaminates from the outer layer 11 due to friction between the inner ring 25 and the inner layer 13. In the present embodiment, even in such case, the inner layer support portion 9c inhibits slip down of the inner layer 13, and thus it is possible to inhibit falling out of the inner bag 14 in the outer shell 12.

As illustrated in FIGS. 3 through 5, the storage portion 7 is provided with a main portion 19 having an approximately constant cross-sectional shape in longitudinal directions of the storage portion and a shoulder portion 17 linking the main portion 19 to the mouth 9. The shoulder portion 17 is equipped with a bent portion 22. The bent portion 22 is an area with a bending angle α illustrated in FIG. 3 of 140 degrees or less and having a radius of curvature on a container inner surface side of 4 mm or less. Without the bent portion 22, the delamination between the inner layer 13 and the outer layer 11 sometimes extends from the main portion 19 to the mouth 9 to delaminate the inner layer 13 from the outer layer 11 even in the mouth 9. The delamination of the inner layer 13 from the outer layer 11 in the mouth 9 is, however, undesirable because the delamination of the inner layer 13 from the outer layer 11 in the mouth 9 causes falling out of the inner bag 14 in the outer shell 12. Since the bent portion 22 is provided in the present embodiment, even when delamination between the inner layer 13 and the outer layer 11 extends from the main portion 19 to the bent portion 22, the inner layer 13 is bent at the bent portion 22 as illustrated in FIG. 5 and the force to delaminate the inner layer 13 from the outer layer 11 is not transmitted to the area above the bent portion 22. As a result, the delamination between the inner layer 13 and the outer layer 11 in the area above the bent portion 22 is inhibited. Although, in FIGS. 3 through 5, the bent portion 22 is provided in the shoulder portion 17, the bent portion 22 may be provided at the boundary between the shoulder portion 17 and the main portion 19.

Although the lower limit of bending angle α, is not particularly defined, it is preferably 90 degrees or more for ease of manufacture. Although the lower limit of the radius of curvature is not particularly defined, it is preferably 0.2 mm or more for ease of manufacture. In order to prevent delamination of the inner layer 13 from the outer layer 11 in the mouth 9 more securely, the bending angle α is preferably 120 degrees or less and the radius of curvature is preferably 2 mm or less. Specifically, the bending angle α is, for example, 90, 95, 100, 105, 110, 115, 120, 125, 130, 135, and 140 degrees or it may be in a range between any two values exemplified here. Specifically, the radius of curvature is, for example, 0.2, 0.4, 0.6, 0.8, 1, 1.2, 1.4, 1.6, 1.8, and 2 mm or it may be in a range between any two values exemplified here.

As illustrated in FIG. 4, the bent portion 22 is provided in a position where a distance L2 from a container center axis C to the container inner surface in the bent portion 22 is 1.3 times or more of a distance L1 from the container center axis C to the container inner surface in the mouth 9. The delaminatable container 1 in the present embodiment is formed by blow molding. The larger L2/L1 causes a larger blow ratio in the bent portion 22, which results in a thinner thickness. When L2/L1≥1.3, the thickness of the inner layer 13 in the bent portion 22 thus becomes sufficiently thin and the inner layer 13 is easily bent at the bent portion 22 to more securely inhibit delamination of the inner layer 13 from the outer layer 11 in the mouth 9. L2/L1 is, for example, from 1.3 to 3 and preferably from 1.4 to 2. Specifically, L2/L1 is, for example, 1.3, 1.4, 1.5, 1.6, 1.7, 1.8, 1.9, 2, 2.5, and 3 or it may be in a range between any two values exemplified here.

To give an example, the thickness in the mouth 9 is from 0.45 to 0.50 mm, the thickness in the bent portion 22 is from 0.25 to 0.30 mm, and the thickness of the main portion 19 is from 0.15 to 0.20 mm. The thickness in the bent portion 22 is thus sufficiently less than the thickness in the mouth 9, thereby effectively exhibiting functions of the bent portion 22.

As illustrated in FIG. 4, the storage portion 7 is equipped with the valve member 5 to regulate entrance and exit of air between an external space S of the container body 3 and an intermediate space 21 between the outer shell 12 and the inner bag 14. The outer shell 12 is equipped with a fresh air inlet 15 communicating with the intermediate space 21 and the external space S in the storage portion 7. The fresh air inlet 15 is a through hole provided only in the outer shell 12 and does not reach the inner bag 14. The valve member 5 is provided with an axis 5a inserted into the fresh air inlet 15 and capable of sliding movement relative to the fresh air inlet 15, a lid 5c provided on the intermediate space 21 side of the axis 5a and having a cross-sectional area greater than that of the axis 5a, and a locking portion 5b provided on the external space S side of the axis 5a and preventing entrance of the valve member 5 to the intermediate space 21.

The lid 5c is configured to substantially close the fresh air inlet 15 when the outer shell 12 is compressed and shaped to have a smaller cross-sectional area as coming closer to the axis 5a. The locking portion 5b is configured to be capable of introducing air in the intermediate space 21 when the outer shell 12 is restored after compression. When the outer shell 12 is compressed, the pressure in the intermediate space 21 becomes higher than external pressure and the air in the intermediate space 21 leaks outside from the fresh air inlet 15. The pressure difference and the air flow cause the lid 5c to move toward the fresh air inlet 15 to close the fresh air inlet 15 by the lid 5c. Since the lid 5c has a shape with a smaller cross-sectional area as coming closer to the axis 5a, the lid 5c readily fits into the fresh air inlet 15 to close the fresh air inlet 15.

Figure 8:
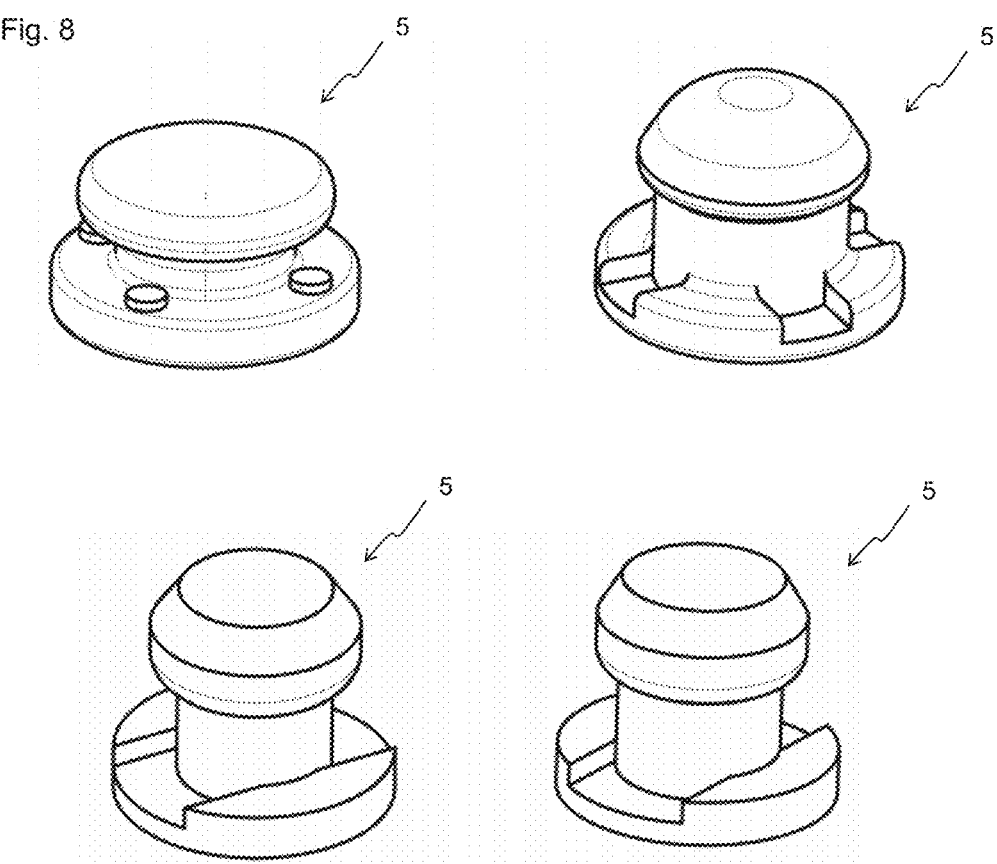
FIG. 8 shows perspective views illustrating various structures of the valve member 5.

When the outer shell 12 is further compressed in this state, the pressure in the intermediate space 21 is increased, and as a result, the inner bag is compressed to deliver the contents in the inner bag 14. When the compressive force to the outer shell 12 is released, the outer shell 12 attempts to restore its shape by the elasticity of its own. At this point, the lid 5c is separated from the fresh air inlet 15 and the closure of the fresh air inlet 15 is released to introduce fresh air in the intermediate space 21. Not to cause the locking portion 5b to close the fresh air inlet 15, the locking portion 5b is equipped with projections 5d in a portion abutting on the outer shell 12. The projections 5d abut on the outer shell 12 to provide gaps between the outer shell 12 and the locking portion 5b. Instead of providing the projections 5d, closure of the fresh air inlet 15 by the locking portion 5b may be prevented by providing grooves in the locking portion 5b. FIG. 8 illustrates specific examples of the structure of the valve member 5.

The valve member 5 is mounted to the container body 3 by inserting the lid 5c into the intermediate space 21 while the lid 5c presses and expands the fresh air inlet 15. The lid 5c, therefore, preferably has an end in a tapered shape. Since such valve member 5 can be mounted only by pressing the lid 5c from outside the container body 3 into the intermediate space 21, it is excellent in productivity.

After the valve member 5 is mounted, the storage portion 7 is covered with a shrink film. At this point, not to allow the valve member 5 to interfere with the shrink film, the valve member 5 is mounted to a valve member mounting recess 7a provided in the storage portion 7. Not to seal the valve member mounting recess 7a with the shrink film, an air circulation groove 7b extending from the valve member mounting recess 7a in the direction of the mouth 9 is provided.

The valve member mounting recess 7a is provided in the shoulder portion 17 of the outer shell 12. The shoulder portion 17 is an inclined surface, and a flat region FR is provided in the valve member mounting recess 7a. Since the flat region FR is provided approximately in parallel with the inclined surface of the shoulder portion 17, the flat region FR is also an inclined surface. Since the fresh air inlet 15 is provided in the flat region FR in the valve member mounting recess 7a, the fresh air inlet 15 is provided in the inclined surface. When the fresh air inlet 15 is provided in, for example, a vertical surface of the main portion 19, there is a risk that the once delaminated inner bag 14 makes contact with the valve member 5 to interfere with movement of the valve member 5. In the present embodiment, since the fresh air inlet 15 is provided in the inclined surface, there is no such risk and smooth movement of the valve member 5 is secured. Although not particularly limited, an inclination angle of the inclined surface is preferably from 45 to 89 degrees, more preferably from 55 to 85 degrees, and even more preferably from 60 to 80 degrees.

Figure 1B:
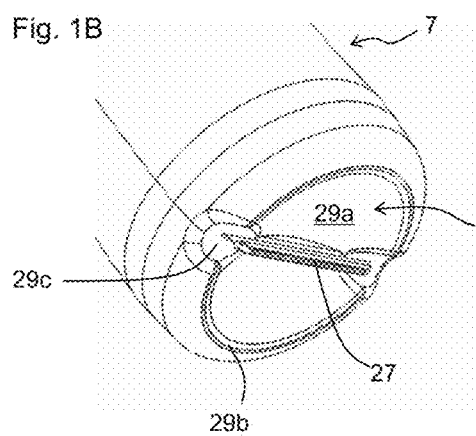
Figure 1C:
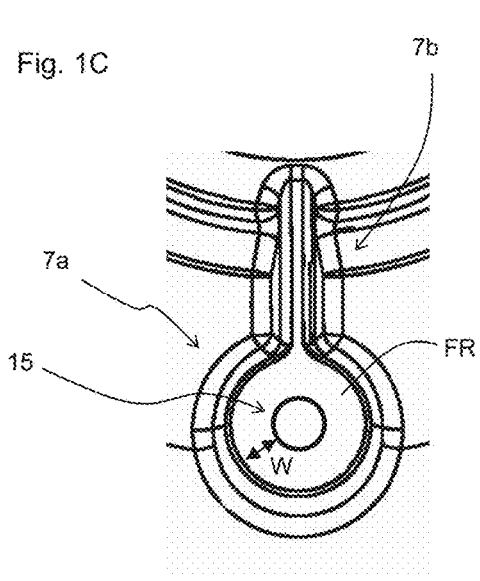

As illustrated in FIG. 1C, the flat region FR in the valve member mounting recess 7a is provided across a width W of 3 mm or more (preferably 3.5 mm, 4 mm, or more) surrounding the fresh air inlet 15. For example, when the fresh air inlet 15 is φ4 mm and the fresh air inlet 15 is formed at the center of the flat region FR, the valve member mounting recess 7a is designed to be φ10 mm or more. Although the upper limit of the width W of the flat region FR is not particularly defined, the width W is preferably not too large because a larger width W of the flat region FR causes the valve member mounting recess 7a to have a greater area, and as a result, the area of the gap between the outer shell 12 and the shrink film. The upper limit is, for example, 10 mm. Accordingly, the width W is, for example, from 3 to 10 mm. Specifically, it is, for example, 3, 3.5, 4, 4.5, 5, 6, 7, 8, 9, and 10 mm or it may be in a range between any two values exemplified here.

According to an experiment by the present inventors, it is found that a wider flat region FR on an outer surface side of the outer shell 12 causes a larger radius of curvature on an inner surface of the outer shell 12, and when the flat region FR is provided across the range of 3 mm or more surrounding the fresh air inlet 15 on the outer surface side of the outer shell, the radius of curvature on the inner surface of the outer shell 12 is sufficiently large, and as a result, the close adherence between the outer shell 12 and the valve member 5 is improved. The radius of curvature on the inner surface of the outer shell 12 is preferably 200 mm or more in a range of 2 mm surrounding the fresh air inlet 15 and even more preferably 250 mm or more or 300 mm or more. This is because, when the radius of curvature has such value, the inner surface of the outer shell 12 substantially becomes flat and the close adherence between the outer shell 12 and the valve member 5 is good.

Figure 6A:
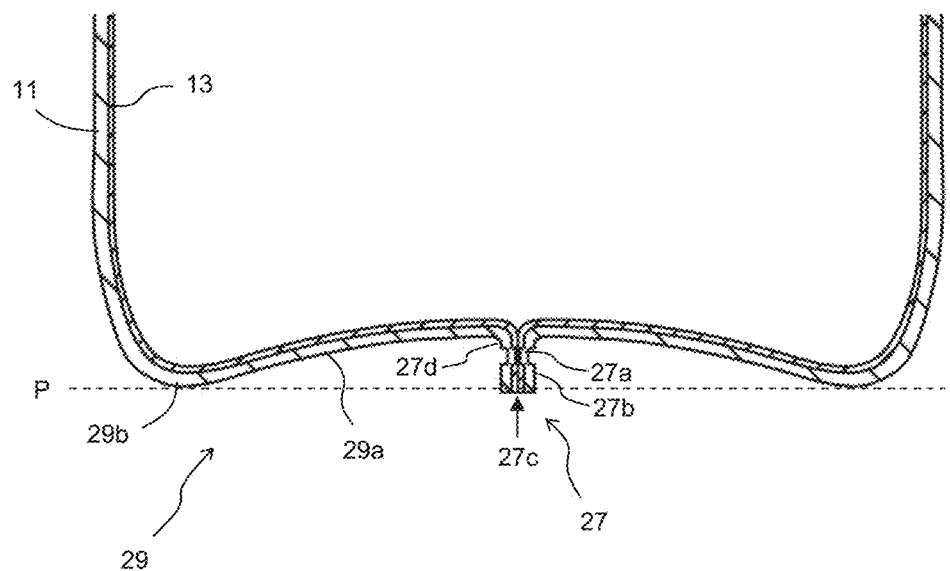
FIGS. 6A, 6B are enlarged views of a region including a bottom surface 29 in FIG. 3, where
Figure 6B:
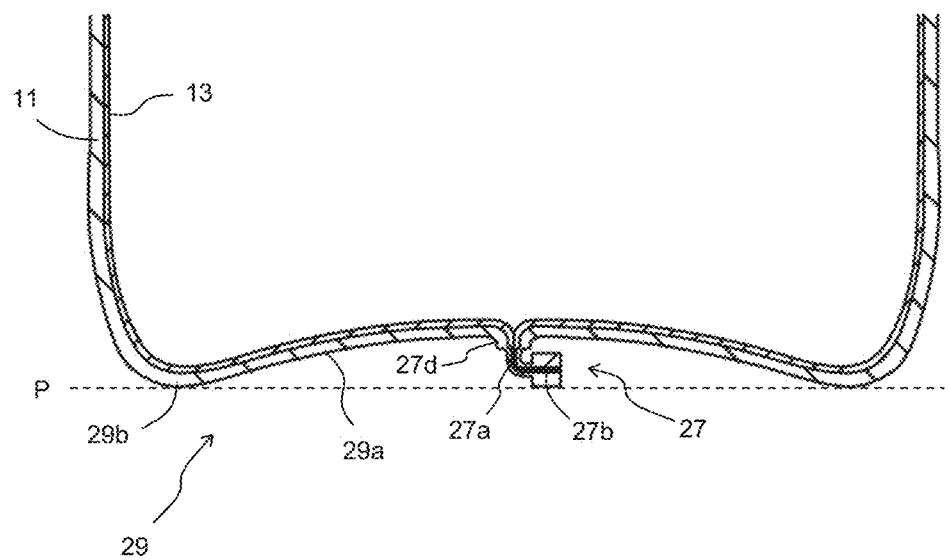

As illustrated in FIG. 1B, the storage portion 7 has a bottom surface 29 equipped with a central concave region 29a and a peripheral region 29b surrounding the former region, and the central concave region 29a is provided with a bottom seal protrusion 27 protruding from the bottom surface 29. As illustrated in FIGS. 6A and 6B, the bottom seal protrusion 27 is a sealing portion of a laminated parison in blow molding using a tubular laminated parison provided with the outer layer 11 and the inner layer 13. The bottom seal protrusion 27 is provided with, in order from the bottom surface 29 side, a base portion 27d, a thinner portion 27a, and a thicker portion 27b having a thickness greater than that of the thinner portion 27a.

Immediately after blow molding, as illustrated in FIG. 6A, the bottom seal protrusion 27 is in a state of standing approximately vertically to a plane P defined by the peripheral region 29b. In this state, however, when impact is applied to the container, the inner layers 13 in a welded portion 27c are prone to be separated from each other and the impact resistance is insufficient. In the present embodiment, the thinner portion 27a is softened by blowing hot air on the bottom seal protrusion 27 after blow molding to bend the bottom seal protrusion 27, as illustrated in FIG. 6B, in the thinner portion 27a. The impact resistance of the bottom seal protrusion 27 is thus improved simply by a simple procedure of bending the bottom seal protrusion 27. In addition, as illustrated in FIG. 6B, the bottom seal protrusion 27 does not protrude from the plane P defined by the peripheral region 29b in a state of being bent. This prevents, when the delaminatable container 1 is stood, instability of the delaminatable container 1 due to the bottom seal protrusion 27 sticking out of the plane P.

The base portion 27d is provided on the bottom surface 29 side closer than the thinner portion 27a and is an area thicker than the thinner portion 27a. Although the base portion 27d does not have to be provided, the impact resistance of the bottom seal protrusion 27 is further improved by providing the thinner portion 27a on the base portion 27d.

As illustrated in FIG. 1B, the concave region in the bottom surface 29 is provided across the entire bottom surface 29 in longitudinal directions of the bottom seal protrusion 27. That is, the central concave region 29a and the peripheral concave region 29c are connected. Such structure facilitates bending of the bottom seal protrusion 27.

The layer structure of the container body 3 is described below in further detail. The container body 3 is provided with the outer layer 11 and the inner layer 13. The outer layer 11 is formed with a larger thickness than the inner layer 13 so as to increase the restorability thereof.

Figure 7:
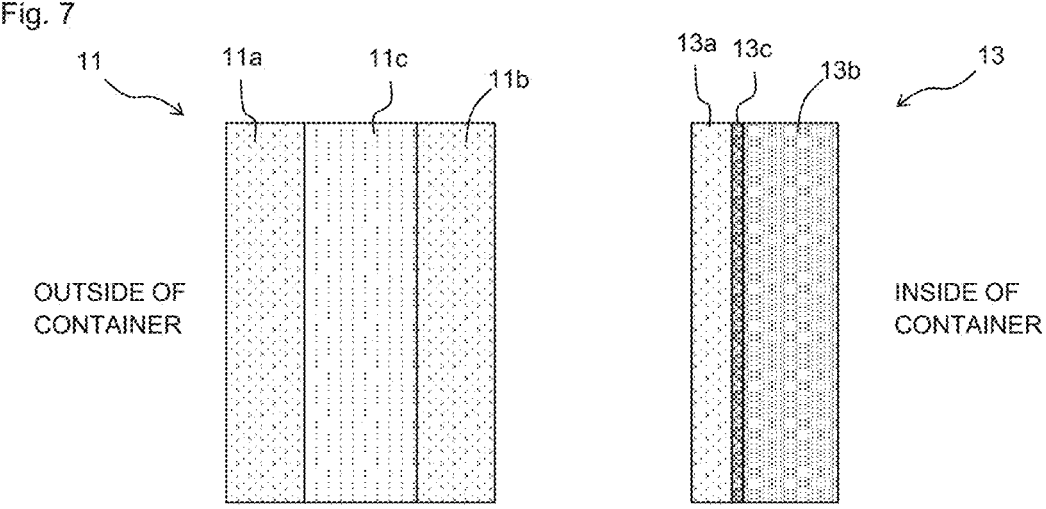
FIG. 7 is cross-sectional views illustrating layer structures of the outer layer 11 and the inner layer 13.

The outer layer 11 is formed of, for example, low-density polyethylene, linear low-density polyethylene, high-density polyethylene, polypropylene, ethylene-propylene copolymer, or a mixture thereof, or the like. The outer layer 11 consists of a single layer or multiple layers, and at least one of the innermost and outermost layers thereof contains a lubricant. If the outer layer 11 consists of a single layer, that single layer serves as both innermost and outermost layers. Accordingly, that layer only has to contain a lubricant. If the outer layer 11 consists of two layers, the layer closer to the inside of the container serves as the innermost layer, and the layer closer to the outside of the container serves as the outermost layer. Accordingly, at least one of these layers only has to contain a lubricant. If the outer layer 11 consists of three layers, the layer closest to the inside of the container serves as the innermost layer, and the layer closest to the outside of the container serves as the outermost layer. As shown in FIG. 7, the outer layer 11 preferably includes a repro layer 11c between an innermost layer 11b and an outermost layer 11a. As used herein, the term "repro layer" refers to a layer formed by recycling burrs generated when a container is molded. Further, if the outer layer 11 consists of multiple layers, both the innermost and outermost layers preferably contain a lubricant.

The lubricant may be any type of commercially available common lubricant. The lubricant may be one of a hydrocarbon-based lubricant, a fatty acid-based lubricant, an aliphatic amide-based lubricant, a metal soap-based lubricant, and a combination of two or more thereof. Examples of the hydrocarbon-based lubricant include liquid paraffin, paraffin wax, and synthesized polyethylene wax. Examples of the fatty acid-based lubricant include stearic acid and stearyl alcohol. Examples of the aliphatic amide-based lubricant include fatty amides, such as stearamide, oleic amide, and erucic acid amide, and alkylene fatty amides, such as methylene bis(stearamide) and ethylene bis(stearamide).

The innermost layer of the outer layer 11 is a layer that makes contact with the inner layer 13. By containing the lubricant in the innermost layer of the outer layer 11, it is possible to improve delamination properties between the outer layer 11 and the inner layer 13 and to improve deliverability of the contents of the delaminatable container. Meanwhile, the outermost layer of the outer layer 11 is a layer that makes contact with a die during blow molding. By containing the lubricant in the outermost layer of the outer layer 11, it is possible to improve releasability.

One or both of the innermost layer and the outermost layer of the outer layer 11 may be formed with a random copolymer of propylene and another monomer. This enables improvement in shape restorability, transparency, and heat resistance of the outer shell 12.

The random copolymer has a content of a monomer other than propylene of less than 50 mol % and preferably from 5 to 35 mol %. Specifically, this content is, for example, 5, 10, 15, 20, 25, and 30 mol % or it may be in a range between any two values exemplified here. The monomer to be copolymerized with propylene may be one that improves impact resistance of the random copolymer compared with a homopolymer of polypropylene, and ethylene is particularly preferred. In the case of a random copolymer of propylene and ethylene, the ethylene content is preferably from 5 to 30 mol %. Specifically, it is, for example, 5, 10, 15, 20, 25, and 30 mol % or it may be in a range between any two values exemplified here. The random copolymer preferably has a weight average molecular weight from 100 thousands to 500 thousands, and even more preferably from 100 thousands to 300 thousands. Specifically, the weight average molecular weight is, for example, 100 thousands, 150 thousands, 200 thousands, 250 thousands, 300 thousands, 350 thousands, 400 thousands, 450 thousands, and 500 thousands or it may be in a range between any two values exemplified here.

The random copolymer has a tensile modulus of elasticity preferably from 400 to 1600 MPa and more preferably from 1000 to 1600 MPa. This is because the shape restorability is particularly good with a tensile modulus of elasticity in such range. Specifically, the tensile modulus of elasticity is, for example, 400, 500, 600, 700, 800, 900, 1000, 1100, 1200, 1300, 1400, 1500, and 1600 Mpa or it may be in a range between any two values exemplified here.

Since an excessively hard container impairs feeling of using the container, a mixture obtained by mixing a flexible material, such as linear low density polyethylene, with the random copolymer may be used. Note that, in order not to severely interfere with effective properties of the random copolymer, the material to be mixed with the random copolymer is preferably mixed to be less than 50 weight % based on the entire mixture. For example, a mixture obtained by mixing the random copolymer and linear low-density polyethylene at a weight ratio of 85:15 may be used.

As illustrated in FIG. 7, the inner layer 13 includes an EVOH layer 13a provided on a container outer surface side, an inner surface layer 13b provided on a container inner surface side of the EVOH layer 13a, and an adhesion layer 13c provided between the EVOH layer 13a and the inner surface layer 13b. By providing the EVOH layer 13a, it is possible to improve gas barrier properties and delamination properties from the outer layer 11.

The EVOH layer 13a is a layer containing an ethylene-vinyl alcohol copolymer (EVOH) resin and is obtained by hydrolysis of a copolymer of ethylene and vinyl acetate. The EVOH resin has an ethylene content, for example, from 25 to 50 mol %, and from the perspective of oxygen barrier properties, it is preferably 32 mol % or less. Although not particularly defined, the lower limit of the ethylene content is preferably 25 mol % or more because the flexibility of the EVOH layer 13a is prone to decrease when the ethylene content is less. The EVOH layer 13a preferably contains an oxygen absorbent. The content of an oxygen absorbent in the EVOH layer 13a further improves the oxygen barrier properties of the EVOH layer 13a.

The EVOH resin preferably has a melting point higher than the melting point of the resin contained in the outer layer 11. When the fresh air inlet 15 is formed in the outer layer 11 using a thermal perforator, the inlet is prevented from reaching the inner layer 13 by the EVOH resin having a melting point higher than the melting point of the resin contained in the outer layer 11. From this perspective, a greater difference of (Melting Point of EVOH)−(Melting Point of the Resin from which the outer layer 11 is formed) is desired, and it is preferably 15° C. or more and particularly preferably 30° C. or more. The difference in melting points is, for example, from 5 to 50° C. Specifically, it is, for example, 5, 10, 15, 20, 25, 30, 35, 40, 45, and 50° C. or it may be in a range between any two values exemplified here.

The inner surface layer 13b is a layer to make contact with the contents of the delaminatable container 1. It contains, for example, polyolefin, such as low density polyethylene, linear low density polyethylene, high density polyethylene, polypropylene, an ethylene-propylene copolymer, and a mixture thereof, and preferably low density polyethylene or linear low density polyethylene. The resin contained in the inner surface layer 13b preferably has a tensile modulus of elasticity from 50 to 300 MPa and more preferably from 70 to 200 MPa. This is because the inner surface layer 13b is particularly flexible when the tensile modulus of elasticity is in such range. Specifically, the tensile modulus of elasticity is, for example, specifically for example, 50, 100, 150, 200, 250, and 300 Mpa or it may be in a range between any two values exemplified here.

The adhesion layer 13c is a layer having a function of adhering the EVOH layer 13a to the inner surface layer 13b, and it is, for example, a product of adding acid modified polyolefin (e.g., maleic anhydride modified polyethylene) with carboxyl groups introduced therein to polyolefin described above or an ethylene-vinyl acetate copolymer (EVA). An example of the adhesion layer 13c is a mixture of acid modified polyethylene with low density polyethylene or linear low density polyethylene.

A description is then given to an example of a method of manufacturing the delaminatable container 1 in the present embodiment.

First, as illustrated in FIG. 9A, a laminated parison in a melted state with a laminated structure (e.g., a laminated structure of PE layer/adhesion layer/EVOH layer/PP layer/ repro layer/PP layer in order from the container inner surface side) corresponding to the container body 3 to be manufactured is extruded. Then, the laminated parison in the melted state is set in a blow molding split die and the split die is closed.

Next, as illustrated in FIG. 9B, a blowing nozzle is inserted into an opening of the mouth 9 of the container body 3 to blow air into a cavity of the split die in the mold closing state.

Then, as illustrated in FIG. 9C, the split die is opened to take out a blow molded article. The split die has a cavity shape to form various shapes of the container body 3, such as the valve member mounting recess 7a, the air circulation groove 7b, and the bottom seal protrusion 27, in the blow molded article. The split die is provided with a pinch-off below the bottom seal protrusion 27. Lower burrs are thus formed in the area below the bottom seal protrusion 27 and they are removed.

Then, as illustrated in FIG. 9D, blow molded articles thus taken out are aligned.

Figure 10A:
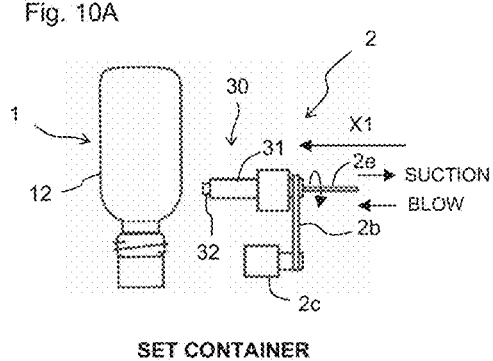
FIGS. 10A-10D illustrate the procedure of manufacturing the delaminatable container 1 following FIGS. 9A-9D, and particularly illustrate fresh air inlet formation and inner layer preliminary delamination procedures.
Figure 10B:
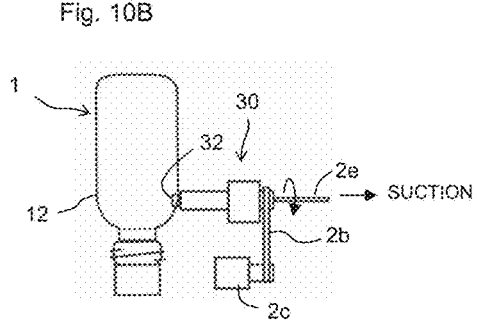
Figure 10C:
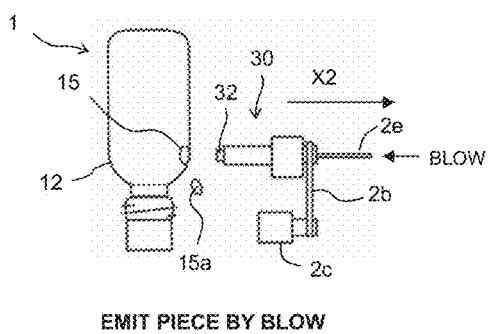

Then, as illustrated in FIGS. 10A to 10C, a perforator 2 is used to form the fresh air inlet 15 in the outer shell 12 of the delaminatable container 1. This procedure is described in detail below.

First, as illustrated in FIG. 10A, the delaminatable container 1 is set in a position close to the perforator 2. The perforator 2 is provided with a boring drill 30, having a body portion 31 and an end portion 32, and a motor 2c to rotationally drive the drill 30 through a transmission belt 2b. The perforator 2 is supported by a servo cylinder (not shown) to single-axis move the perforator 2 by rotation of a servo motor and is configured movably in an arrow X1 direction in FIG. 10A and in an arrow X2 direction in FIG. 10C. Such configuration enables rotation of the drill 30 while pressing the end portion 32 against the outer shell 12 of the delaminatable container 1. The control of the position and the moving speed of the perforator 2 by the servo motor enables reduction in tact time.

The drill 30 is provided with a hollow 33 extending from the body portion 31 to the end portion 32 (see, FIGS. 11A to 12B) and is coupled to a ventilation pipe 2e in communication with the hollow 33. The ventilation pipe 2e is coupled to an air intake and exhaust system, not shown. This enables air suction from inside the drill 30 and air blowing inside the drill 30.

Figure 11E:
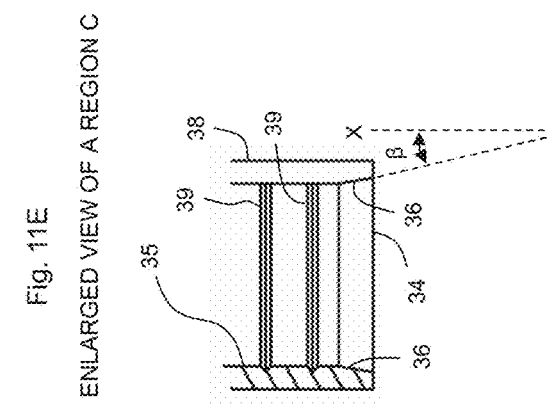
FIGS. 11A-11E illustrate configuration of a boring drill 30 used for formation of a fresh air inlet 15 in FIGS. 10A-10D, where
Figure 11D:
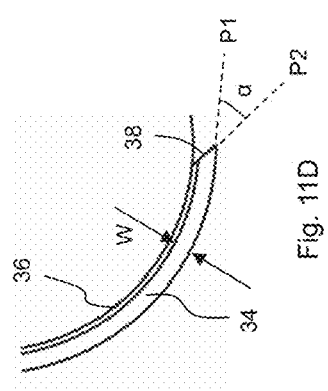
Figure 11C:
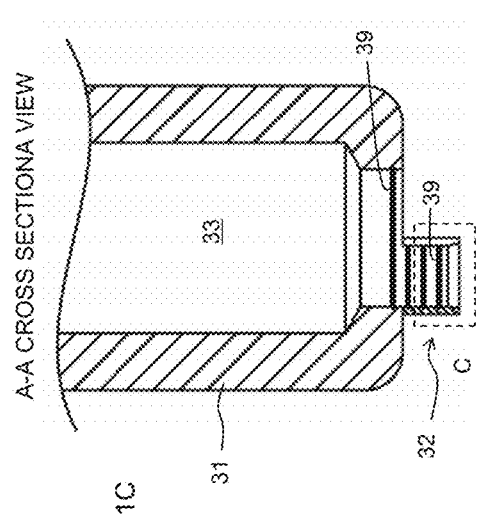
Figure 11A:
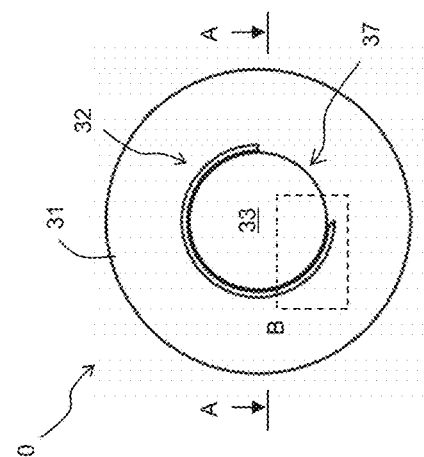
Figure 11B:
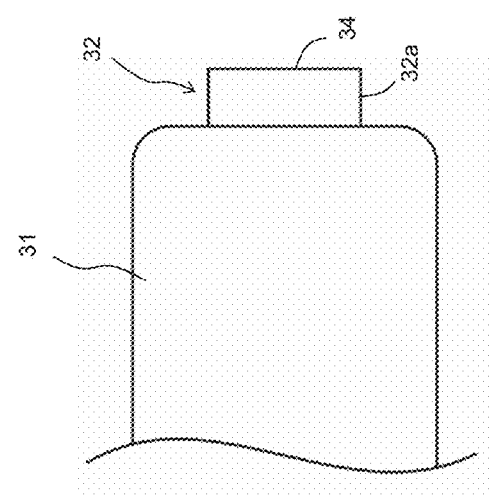
Figure 12A:
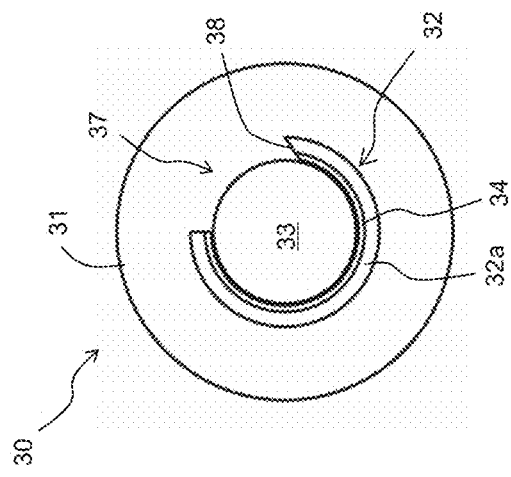
FIGS. 12A, 12B illustrate another configuration of the drill 30 used for formation of the fresh air inlet 15 in FIGS. 10A-10D, where
Figure 12B:
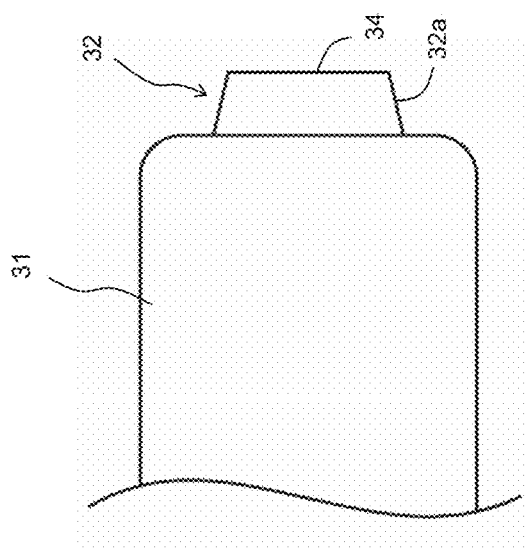

As illustrated in FIGS. 11A to 12B, the end portion 32 of the drill 30 is tubular having a C-shaped cross section. The end portion 32 is provided with a flat surface 34 and a notch 37, and the notch 37 has a side of a blade 38. The end portion 32 has a side 32a that may be, as illustrated in FIGS. 11A-11E, vertical to the flat surface 34 or may be, as illustrated in FIGS. 12A, 12B, a tapered surface inclined to the center as coming closer to the flat surface 34. In the latter case, the formed fresh air inlet 15 has an edge of a tapered surface widening towards outside and thus has an advantage of facilitating insertion of the valve member 5.

The flat surface 34 has a radial width W preferably from 0.1 to 0.2 mm and more preferably from 0.12 to 0.18 mm. A too small width W causes easy damage of the inner bag 14 during perforation. A too large width W causes difficulty in contacting the blade 38 with the outer shell 12, making it difficult to perform smooth perforation. The notch 37 is provided in a range preferably from 60 to 120 degrees and more preferably from 75 to 105 degrees. The notch being provided in a too large range causes easy damage of the inner bag 14 during perforation, whereas the notch being provided in a too small range causes difficulty in smooth perforation. The blade 38 has an inclined plane P2 at an angle α to a circumscribed surface P1 preferably from 30 to 65 degrees and more preferably from 40 to 55 degrees. A too small angle α causes easy damage of the inner bag 14 during perforation, whereas a too large angle α causes difficulty in smooth perforation.

The end portion 32 has an inner surface 35 provided with a tapered surface 36 widening towards the end. This facilitates movement of a cut piece 15a (see, FIG. 10C) produced by perforation to the inner surface 35 side, not remaining on the delaminatable container 1 side. The tapered surface 36 has an angle to the flat surface 34 preferably from 95 to 110 degrees and more preferably from 95 to 105 degrees. In other words, as illustrated in FIG. 11E, the tapered surface 36 has an angle β in a direction X parallel to the rotation axis of the drill 30 preferably from 5 to 20 degrees and more preferably from 5 to 15 degrees. Further, the inner surface 35 is preferably provided with an approximately annular groove 39 in a concave or V shape with a depth from 0.05 to 0.1 mm and a width from 0.1 to 0.2 mm with a pitch from 0.2 to 1 mm in a direction vertical to the flat surface 34 (direction X parallel to the rotation axis of the drill 30), and in this case, the cut piece 15a more readily moves to the inner surface 35. The pitch of the groove 39 is more preferably from 0.3 to 0.7 mm. The inner surface 35 is preferably subjected to blasting for even easier movement of the cut piece 15a to the inner surface 35.

Then, as illustrated in FIG. 10B, while the drill 30 is rotated, the flat surface 34 is pressed against the outer shell 12. At this point, the flat surface 34 digs a little in the outer shell 12. As a result, the outer shell 12 partially enters the notch 37, and the blade 38 makes contact with the outer shell 12 to cut in the outer shell 12. When the flat surface 34 reaches a boundary between the outer shell 12 and the inner bag 14, the outer shell 12 is circularly hollowed to form the fresh air inlet 15 in a round hole shape. At this point, suction of air inside the drill 30 causes suction of the cut piece 15a, formed by hollowing the outer shell 12, in the hollow 33 of the drill 30.

When the flat surface 34 reaches the boundary between the outer shell 12 and the inner bag 14 and then the flat surface 34 is pressed against the inner bag 14, the inner bag 14 is delaminated from the outer shell 12 to be readily deformed towards inside the delaminatable container 1. The flat surface 34 thus does not dig in the inner bag 14 and the inner bag 14 does not make contact with the blade 38 to inhibit damaging of the inner bag 14.

In the present embodiment, the drill 30 is used without heating. This gives an advantage of not melting the edge of the fresh air inlet 15 to form the edge sharply. In order to inhibit influence due to heat generated by the friction between the boring drill 30 and the outer shell 12, the drill 30 is preferably form with a material having a high thermal conductivity (e.g., 35 W/(m·° C.) or higher at 20° C.). To facilitate the perforation more, the drill 30 may be heated. In this case, to keep the inner bag 14 from being melted by the heat of the drill 30, the resin contained in the outermost layer of the inner bag 14 preferably has a melting point higher than the melting point of the resin contained in the innermost layer of the outer shell 12.

Then, as illustrated in FIG. 10C, the perforator 2 is set back in the arrow X2 direction to blow air into the hollow 33 of the drill 30, thereby emitting the cut piece 15a from the edge of the drill 30.

In the above procedures, formation of the fresh air inlet 15 in the outer shell 12 is completed.

Figure 10D:
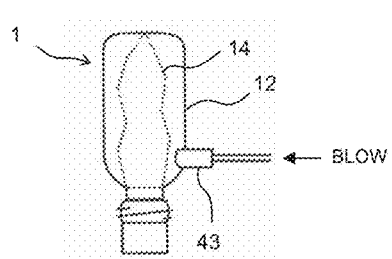

Then, as illustrated in FIG. 10D, air is blown between the outer shell 12 and the inner bag 14 through the fresh air inlet 15 using a blower 43 for preliminary delamination of the inner bag 14 from the outer shell 12. By blowing air in a defined amount while avoiding air leakage through the fresh air inlet 15, preliminary delamination of the inner bag 14 is readily controlled. Although the preliminary delamination may be applied to the entire storage portion 7 or may be applied to part of the storage portion 7, it is preferred that preliminary delamination of the inner bag 14 from the outer shell 12 in approximately the entire storage portion 7 because it is not possible to check the presence of a pinhole in the inner bag 14 in a portion not subjected to preliminary delamination.

Figure 13C:
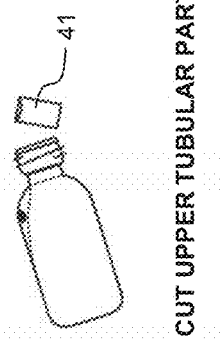
FIGS. 13A-13G illustrate the procedure of manufacturing the delaminatable container 1 in FIGS. 1A-1C following FIGS. 10A-10D.
Figure 13B:
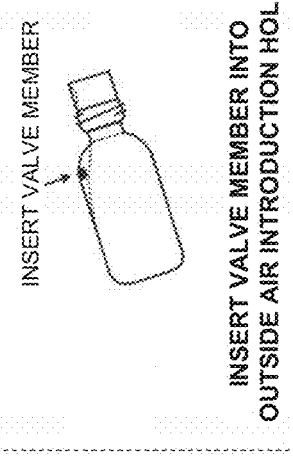
Figure 13A:
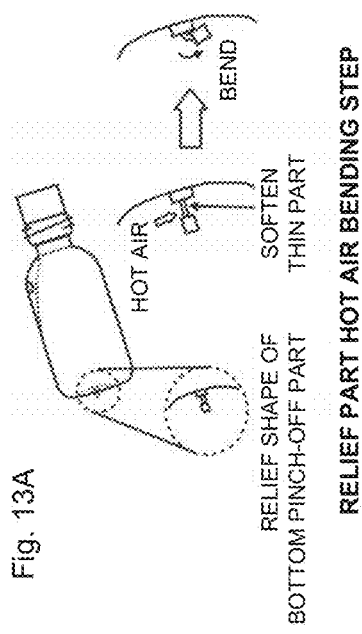

Then, as illustrated in FIG. 13A, the thinner portion 27a is softened by exposing the bottom seal protrusion 27 to hot air to bend the bottom seal protrusion 27.

Then, as illustrated in FIG. 13B, the valve member 5 is inserted into the fresh air inlet 15.

Then, as illustrated in FIG. 13C, an upper tubular portion 41 is cut.

Figure 13D:
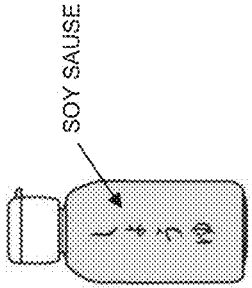

Then, as illustrated in FIG. 13D, the inner bag 14 is expanded by blowing air into the inner bag 14.

Figure 13E:
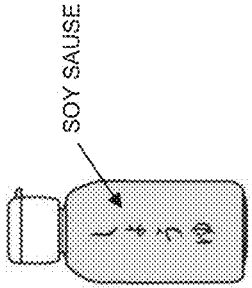

Then, as illustrated in FIG. 13E, the inner bag 14 is filled with the contents.

Figure 13F:
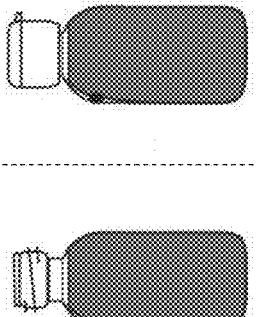

Then, as illustrated in FIG. 13F, the cap 23 is mounted on the mouth 9.

Figure 13G:
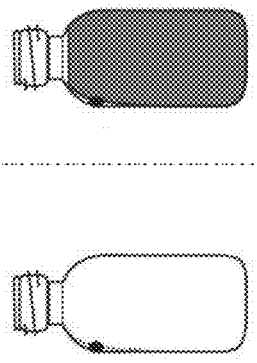

Then, as illustrated in FIG. 13G, the storage portion 7 is covered with a shrink film to complete the product.

The order of various procedures described here may be switched appropriately. For example, the hot air bending procedure may be before the fresh air inlet opening procedure or may be before the inner layer preliminary delamination procedure. The procedure of cutting the upper tubular portion 41 may be before inserting the valve member 5 into the fresh air inlet 15.

Then, working principle of the product thus manufactured in use is described.

As illustrated in FIGS. 14A through 14C, in a state where the product filled with the contents, a side of the outer shell 12 is squeezed for compression to deliver the contents. At the start of use, there is substantially no gap between the inner bag 14 and the outer shell 12, and thus the compressive force applied to the outer shell 12 directly becomes a compressive force to the inner bag 14 and the inner bag 14 is compressed to deliver the contents.

The cap 23 has a built-in check valve, not shown, so that it is capable of delivering the contents in the inner bag 14 but not capable of taking fresh air in the inner bag 14. Therefore, when the compressive force applied to the outer shell 12 is removed after delivery of the contents, the outer shell 12 attempts to be back in the original shape by the restoring force of itself but the inner bag 14 remains deflated and only the outer shell 12 expands. Then, as illustrated in FIG. 14D, inside the intermediate space 21 between the inner bag 14 and the outer shell 12 is in a reduced pressure state to introduce fresh air in the intermediate space 21 through the fresh air inlet 15 formed in the outer shell 12. When the intermediate space 21 is in a reduced pressure state, the lid 5c is not pressed against the fresh air inlet 15 and thus it does not interfere with introduction of fresh air. Not to cause the locking portion 5b to interfere with introduction of fresh air even in a state where the locking portion 5b makes contact with the outer shell 12, the locking portion 5b is provided with an air passage securing mechanism, such as the projections 5d and grooves.

Then, as illustrated in FIG. 14E, when the side of the outer shell 12 is again squeezed for compression, the lid 5c closes the fresh air inlet 15 to increase the pressure in the intermediate space 21, and the compressive force applied to the outer shell 12 is transmitted to the inner bag 14 via the intermediate space 21 and the inner bag 14 is compressed by this force to deliver the contents.

Then, as illustrated in FIG. 14F, when the compressive force applied to the outer shell 12 is removed after delivery of the contents, the outer shell 12 is restored in the original shape by the restoring force of itself while fresh air is introduced in the intermediate space 21 from the fresh air inlet 15.

1: Delaminatable Container, 3: Container Body, 5: Valve Member, 7: Storage Portion, 9: Mouth, 11: Outer Layer, 12: Outer Shell, 13: Inner Layer, 14: Inner Bag, 15: Fresh Air Inlet, 23: Cap, 27: Bottom Seal Protrusion

The invention claimed is:

1. A method of machining a workpiece, the workpiece being a delaminatable container including an outer shell and an inner bag, the inner bag delaminating from the outer shell to be shrunk along with a decrease in the contents, the method comprising:

machining to form a fresh air inlet in the outer shell using a boring drill having a tubular end portion and a body portion and a hollow, the hollow extends from the body portion to the end portion, the end portion provided with a flat surface and a notch, and having a blade on a side of the notch, by pressing the flat surface against the outer shell round cut piece while rotating the drill to contact the blade with the outer shell, so that the outer shell is hollowed to form a round cut piece and the round cut piece is moved to an inner surface side of the end portion, after separating the boring drill from the outer shell, emitting the round cut piece, kept on the inner surface of the end portion, from the edge of the drill by blowing air into the hollow of the drill.

2. The method of claim 1, wherein the end portion of the drill has a C-shaped cross section.

3. The method of claim 1, wherein the flat surface has a radial width from 0.1 to 0.2 mm.

4. The method of claim 1, wherein the end portion has an inner surface provided with a tapered surface widening towards an end.

* * * * *